United States Patent
Kelly et al.

(10) Patent No.: US 7,865,561 B2
(45) Date of Patent: Jan. 4, 2011

(54) INCREASING SPAM SCANNING ACCURACY BY RESCANNING WITH UPDATED DETECTION RULES

(75) Inventors: Nick Kelly, Milton Keynes (GB); Guy Roberts, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 209 days.

(21) Appl. No.: 12/078,515

(22) Filed: Apr. 1, 2008

(65) Prior Publication Data
US 2009/0248814 A1    Oct. 1, 2009

(51) Int. Cl.
G06F 15/16    (2006.01)
G06F 15/173    (2006.01)
(52) U.S. Cl. .................. 709/206; 709/224; 709/204
(58) Field of Classification Search .................. None
See application file for complete search history.

(56) References Cited

U.S. PATENT DOCUMENTS

| | | | |
|---|---|---|---|
| 2006/0168031 A1* | 7/2006 | Cai et al. | 709/206 |
| 2006/0168035 A1* | 7/2006 | Cai et al. | 709/206 |
| 2006/0277264 A1* | 12/2006 | Rainisto | 709/206 |
| 2007/0220607 A1* | 9/2007 | Sprosts et al. | 726/24 |
| 2008/0028029 A1* | 1/2008 | Hart | 709/206 |
| 2008/0155693 A1* | 6/2008 | Mikan et al. | 726/23 |
| 2008/0282351 A1* | 11/2008 | Khilnani et al. | 726/24 |

* cited by examiner

*Primary Examiner*—John B. Walsh
(74) *Attorney, Agent, or Firm*—Zilka-Kotab, PC

(57) ABSTRACT

A method, system, and computer program product for processing email messages rescans emails messages that have already been scanned for spam and delivered to user inboxes with updated spam detection rules. This increases the accuracy of spam scanning and reduces the need for users to submit missed spam in emails that was not detected at the time the emails were received, but would subsequently be detected with newer anti-spam rules. A method of processing email messages comprises receiving email messages in a local inbox or in an inbox on an email server, or both, the received email messages having been scanned using spam detection rules to determine whether or not they include spam, obtaining updated spam detection rules, and rescanning at least some of the received email messages using the updated spam detection rules to determine whether or not they include spam.

26 Claims, 3 Drawing Sheets

US 7,865,561 B2

INCREASING SPAM SCANNING ACCURACY BY RESCANNING WITH UPDATED DETECTION RULES

BACKGROUND OF THE INVENTION

1. Field of the Invention

The present invention relates to scanning email messages to detect whether the messages include spam, and in particular, to rescanning email messages that have already been delivered with updated spam detection rules.

2. Description of the Related Art

The prevalence of unsolicited commercial email, commonly known as spam has grown rapidly and is still growing. The corporate world and individual home users are spending millions of dollars to combat spam. Internet Service Providers (ISPs) have to cope with greatly increasing day-to-day amounts of network traffic due to the increase in spam emails. If spam traffic continues to grow, it may become unmanageable in the near future.

Typically, spam has been fought by the use of software that scans incoming email messages to determine whether each message is spam. Typical methods for scanning and detecting that an email message is spam include email filtering based on the content of the email, DNS-based blackhole lists (DNSBL), greylisting, sender reputation, spamtraps, enforcing technical requirements, checksumming systems to detect bulk email, and by putting some sort of cost on the sender via a Proof-of-work system or a micropayment.

Typically, Anti-Spam software is installed at the mail server level in a corporate environment, and scans emails as they are received at the mail gateway or email server. The messages are scanned for spam at this time, and if they are not detected as spam they are then delivered to the user's inbox.

The emails are scanned by the latest anti-spam rules, but these may not detect certain messages as spam. It is common that Anti-spam companies receive spam samples at around the same time as customers and existing anti-spam rules may not be able to proactively block some spam, so subsequent anti-spam rule updates may include updated rules to detect spam that was previously missed a few minutes prior. Because the messages have already been scanned and delivered to the users inbox, they are not marked as spam even though newer anti-spam signatures would mark them as such. A significant percentage of missed spam is spam that was not detected at the time it was received, but was subsequently detected with newer anti-spam rules.

A need arises for a technique that increases the accuracy of spam scanning and reduces the need for users to submit missed spam in emails that was not detected at the time the emails were received, but would subsequently be detected with newer anti-spam rules.

SUMMARY OF THE INVENTION

A method, system, and computer program product for processing email messages rescans emails messages that have already been scanned for spam and delivered to user inboxes with updated spam detection rules. This increases the accuracy of spam scanning and reduces the need for users to submit missed spam in emails that was not detected at the time the emails were received, but would subsequently be detected with newer anti-spam rules.

A method of processing email messages comprises receiving email messages in a local inbox or in an inbox on an email server, or both, the received email messages having been scanned using spam detection rules to determine whether or not they include spam, obtaining updated spam detection rules, and rescanning at least some of the received email messages using the updated spam detection rules to determine whether or not they include spam. The received email messages may have been scanned by the email server. The rescanning may be performed by a user computer system. The messages that are rescanned may be in a local inbox on the user computer system. The messages that are rescanned may be in an inbox on the email server. The updated spam detection rules may be obtained from the email server, from an update server, or via a peer-to-peer connection. The updated spam detection rules may be obtained from the email server after spam detection rules used by the email server are updated. Each email message may include information indicating a version of spam detection rules that were used by the email server to scan the email and the rescanning is performed by rescanning only email messages that were scanned using a version of spam detection rules that is older than the current spam detection rules.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A method, system, and computer program product for rescanning for spam, with updated spam detection rules, email messages that have already been delivered to user inboxes to increase the accuracy of spam scanning and reduce the need for users to submit missed spam in emails that was not detected at the time the emails were received, but would subsequently be detected with newer anti-spam rules. In addition to the scanning software installed on the email server, a small plug-in is installed on the end user workstations, which downloads the latest streaming rules that are installed on the mail server or another shared update server, or via peer to peer connection. The plug-in then rescans the unread messages in the user inbox periodically. This provides the capability to rescan when mail is received when the user is not working or overnight, as the new mail would be periodically rescanned with newer signatures. The additional spam that is detected with the updated rules would be marked as spam, deleted or quarantined.

Typical streaming update detection rules are updated every few minutes, so there is a good chance that this client plug-in would further reduce spam in users inboxes.

Figure 1:
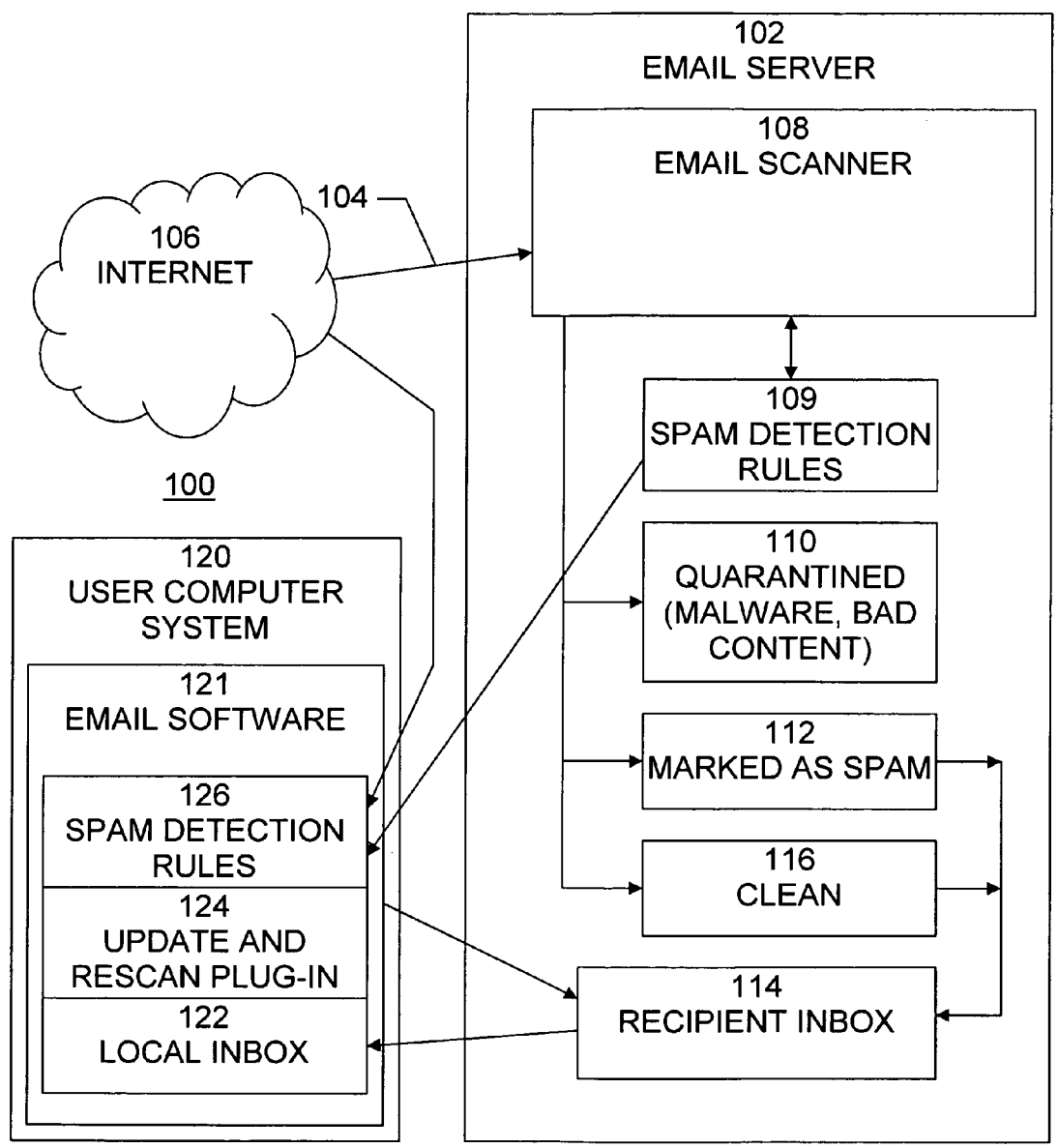
FIG. 1 is an exemplary block diagram of a system in which the present invention may be implemented.

A block diagram of a system 100 in which the present invention may be implemented is shown in FIG. 1. Email server 102 receives email messages 104 via the Internet 106, or other network. The email messages are processed by email scanner 108. Email scanner 108 automates the highlighting, removal or filtering of email spam, malware, and/or bad content by scanning through incoming and outgoing emails in search of traits typical of such undesirable items. Such scanning may include searching for patterns in the headers or bodies of messages. The patterns, signatures, and other information used by email scanner 108 to detect spam in email messages are stored as spam detection rules 109. Each incoming email message is scanned using spam detection rules 109 to determine whether it is a dangerous spam email message, including malware or bad content, which is to be quarantined 110, a spam email message that is to be marked as SPAM 112 and delivered to the recipients inbox 114, or a clean email message 116 that is to be delivered as is to the recipient's inbox 114. Once the message has been scanned, an "X-header" will be added to the email headers to indicate that the message has been scanned. The X-header will include details of the time the message was scanned and the version of the rules used to scan the message.

Also shown in FIG. 1 is an example of a user computer system 120, which includes email software 121. Email software 121 includes or maintains local inbox 122, update and rescan plug-in 124, and spam detection rules 126. Local inbox 122 is a local copy of the user inbox that is maintained on user computer system 120 by email software 121, although local inbox 122 may or may not include exactly the same messages as recipient inbox 114. The email software 121 may include a link to the recipient inbox 114 so that emails residing on the email server can be read and deleted. Typically, email messages that are delivered to recipient inbox 114 by email scanner 108 are further delivered to local inbox 122 on user computer system 120. This delivery may be initiated by user computer system 120, wherein email software 121 may periodically connect to email server 102 and retrieve new email messages, or this delivery may be initiated by email server 102, wherein the email server 102 may periodically, or upon arrival of a new message, connect to user computer system 120 and deliver new email messages. Alternately the email software 121 may be notified when new mail arrives at the recipient inbox 114 and the email software 121 may have direct access to the emails stored on the email server 102 in recipient inbox 114.

Once messages have been delivered to local inbox 122, they are no longer under the control of email server 102 and are no longer subject to scanning, or rescanning, by email scanner 108. The messages in local inbox 122 are, however, under the control of email software 121. Update and rescan plug-in 124 is a software module that is plugged-in or added-on to email software 121. Update and rescan plug-in 124 downloads the latest spam detection rules 126. The updated rules 126 that are downloaded may be the current rules 109 that that are installed on email server 102, or they may be downloaded from another shared update server, either on a local network or on the internet 106. The updated rules 126 may also be downloaded via peer-to-peer connection. Once the updated rules 126 are downloaded, update and rescan plug-in 124 rescans the unread messages in the local inbox 122 and the recipient inbox 114 if the email software 121 maintains a connection to recipient inbox 114. The X-header of each unread message is checked and if the current rules are newer than the rules originally used to scan the mail at the email server 108, the message will be rescanned with the newer spam detection rules 126. The downloading and rescanning may, for example, be performed periodically, based on the occurrence of predefined conditions, such as when the rules have been updated, or based on a predefined schedule. This would particularly help when mail is received when the user is not working or overnight, as the new mail would be rescanned with newer signatures.

Figure 2:
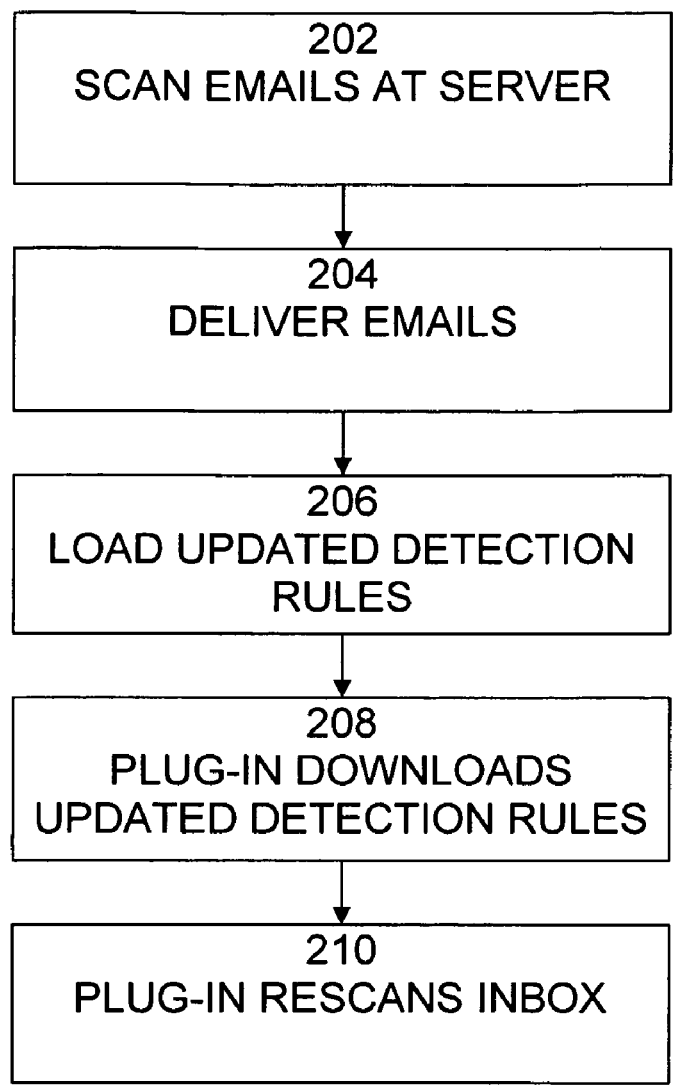
FIG. 2 is an exemplary flow diagram of a process of operation of a spam scanner, according to the present invention.

An example of a process of operation 200 of updating and rescanning email messages is shown in FIG. 2. It is best viewed in conjunction with FIG. 1. Process 200 begins with step 202, in which email messages are received. Each incoming email message is scanned using spam detection rules 109 to determine whether it is a dangerous spam email message, including malware or bad content, which is to be quarantined 110, a spam email message that is to be marked as SPAM 112 and delivered to the recipients inbox 114, or a clean email message 116 that is to be delivered to the recipient's inbox 114. Once the message has been scanned, an "X-header" will be added to the email headers to indicate that the message has been scanned. The X-header will include details of the time the message was scanned and the version of the rules used to scan the message. In step 204, the clean emails 116 and the emails that have been marked as spam 112 are delivered to recipient inbox 114 and/or local inbox 122, as described above.

In step 206, updated spam detection rules are loaded to a server or peer system from which user computer system 120 may obtain the updated spam detection rules 109. As described above, the server may be email server 102 or a shared update server. In step 208, update and rescan plug-in 124 downloads the updated spam detection rules. Update and rescan plug-in 124 may periodically, or upon occurrence of an event, such as receipt of an email, check for updated spam detection rules, or plug-in 124 may receive notification that updated spam detection rules are available. In step 210, plug-in 124 rescans emails in local inbox 122, recipient inbox 114, or both. However, plug-in 124 typically does not rescan all the emails in local inbox 122, recipient inbox 114, or both. Emails that have already been marked as spam are not rescanned. Only "clean" emails are rescanned. Further, plug-in 124 checks the version of the spam detection rules that were used to scan the email and only rescans those emails that were previously scanned using a version of spam detection rules that is older than the updated spam detection rules.

Figure 3:
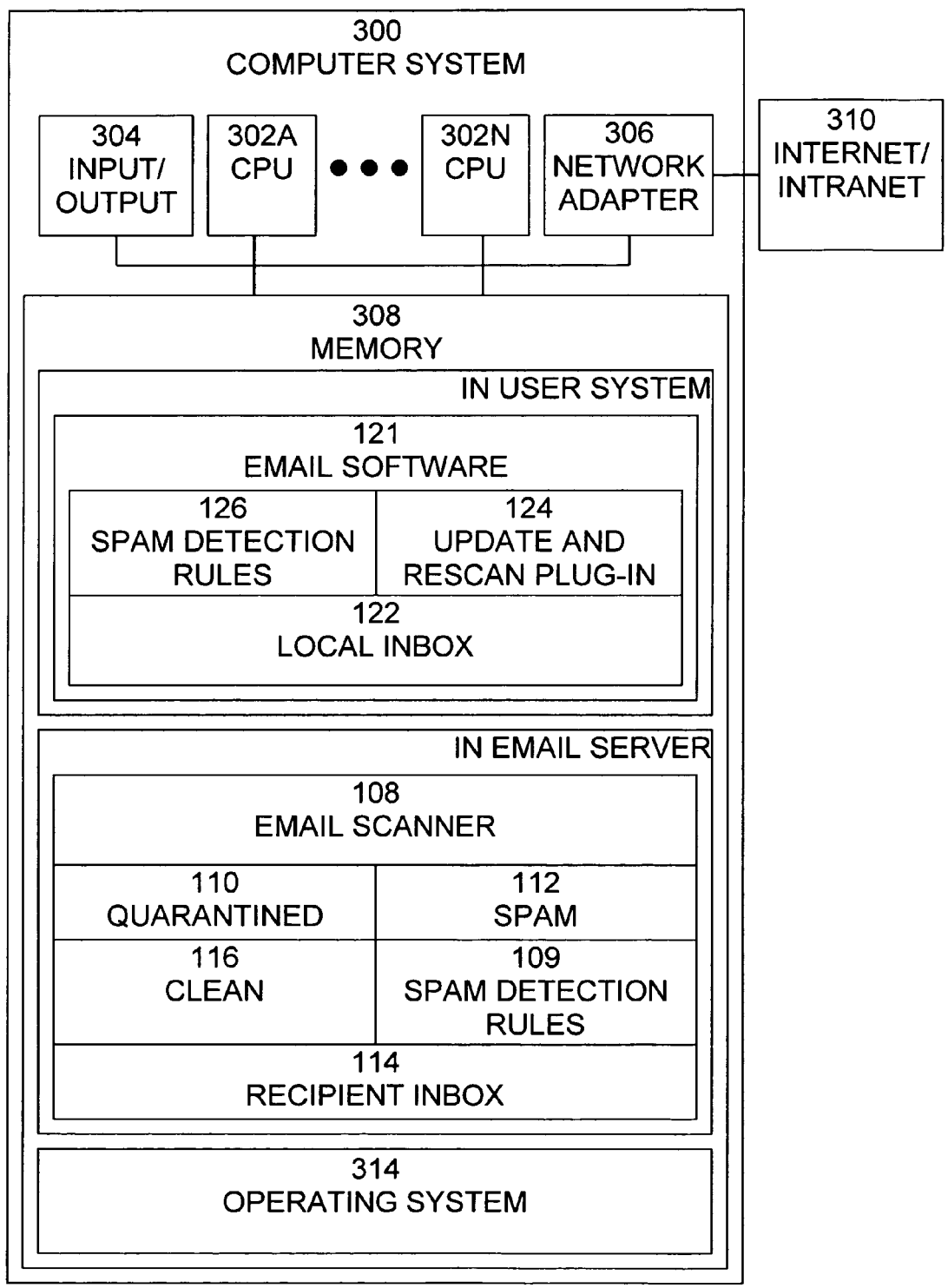
FIG. 3 is an exemplary block diagram of a computer system, such as an email server or user system, in which the present invention may be implemented.

An exemplary block diagram of a computer system 300, such as an email server, in which the present invention may be implemented, is shown in FIG. 3. Computer system 300 is typically a programmed general-purpose computer system, such as a personal computer, workstation, server system, and minicomputer or mainframe computer. Computer system 300 includes one or more processors (CPUs) 302A-302N, input/output circuitry 304, network adapter 306, and memory 308. CPUs 302A-302N execute program instructions in order to carry out the functions of the present invention. Typically, CPUs 302A-302N are one or more microprocessors, such as an INTEL PENTIUM® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present invention also contemplates embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces computer system 300 with Internet/intranet 310. Internet/intranet 310 may include one or more standard local area network (LAN) or wide area network (WAN), such as Ethernet, Token Ring, the Internet, or a private or proprietary LAN/WAN.

Memory 308 stores program instructions that are executed by, and data that are used and processed by, CPU 302 to perform the functions of computer system 300. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

For example, where computer system 300 is a user system, such as user system 120, shown in FIG. 1, memory 308 includes email processing 121 and operating system 314. Email software 121 includes or maintains local inbox 122, update and rescan plug-in 124, and spam detection rules 126. Local inbox 122 is a local copy of the user inbox that is maintained on the user computer system 120 by email software 121. Update and rescan plug-in 124 obtains updates to spam detection rules 126 and then rescans emails in local inbox 122 and or recipient inbox 114 using the updated spam detection rules 126.

In the example that computer system 300 is an email server, such as email server 102, memory 308 includes email scanner 108 and operating system 314. Email scanner 108 automates the highlighting, removal or filtering of email spam, malware, and/or bad content by scanning through incoming and outgoing emails in search of traits typical of such undesirable items. Such scanning may include searching for patterns in the headers or bodies of messages. The patterns, signatures, and other information used by email scanner 108 to detect spam in email messages is stored as spam detection rules 109. Each incoming email message is scanned using spam detection rules 109 to determine whether it is a dangerous spam email message, including malware or bad content, which is to be quarantined 110, a spam email message that is to be marked as SPAM 112 and delivered to the recipient's inbox 114, or a clean email message 116 that is to be delivered as is to the recipient's inbox 114.

In both examples, operating system 314, which may be a different operating system, provides overall system functionality.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. For example, the present invention may be advantageously employed in scanning outgoing email messages, as well as incoming email messages. Accordingly, it is to be understood that the invention is not to be limited by the specific illustrated embodiments, but only by the scope of the appended claims.

What is claimed is:

1. A method of processing email messages, comprising:
receiving email messages in a local inbox or in an inbox on an email server, or both, the received email messages having been scanned using spam detection rules to determine whether or not they include spam;
obtaining updated spam detection rules, utilizing a processor; and
rescanning at least some of the received email messages using the updated spam detection rules to determine whether or not they include spam;
wherein each email message includes information indicating a version of spam detection rules that were used by the email server to scan the email and the rescanning is performed by rescanning only email messages that were scanned using a version of spam detection rules that is older than the updated spam detection rules, based on the information.

2. The method of claim 1, wherein the received email messages were scanned by the email server.

3. The method of claim 2, wherein the rescanning is performed by a user computer system.

4. The method of claim 3, wherein the messages that are rescanned are in a local inbox on the user computer system.

5. The method of claim 3, wherein the messages that are rescanned are in an inbox on the email server.

6. The method of claim 1, wherein the updated spam detection rules are obtained from the email server, from an update server, or via a peer-to-peer connection.

7. The method of claim 1, wherein the updated spam detection rules are obtained from the email server after spam detection rules used by the email server are updated.

8. The method of claim 7, wherein the updated spam detection rules are the updated spam detection rules of the email server.

9. The method of claim 6, wherein a plug-in downloads the updated spam detection rules.

10. The method of claim 3, wherein unread messages in a local inbox on the user computer system are rescanned.

11. A system for processing email messages comprising:
a processor operable to execute computer program instructions;
a memory operable to store computer program instructions executable by the processor; and
computer program instructions stored in the memory and executable to perform the steps of:
receiving email messages in a local inbox or in an inbox on an email server, or both, the received email messages having been scanned using spam detection rules to determine whether or not they include spam;
obtaining updated spam detection rules; and
rescanning at least some of the received email messages using the updated spam detection rules to determine whether or not they include spam;
wherein each email message includes information indicating a version of spam detection rules that were used by the email server to scan the email and the rescanning is performed by rescanning only email messages that were scanned using a version of spam detection rules that is older than the updated spam detection rules, based on the information.

12. The system of claim 11, wherein the received email messages were scanned by the email server.

13. The system of claim 12, wherein the rescanning is performed by a user computer system.

14. The system of claim 13, wherein the messages that are rescanned are in a local inbox on the user computer system.

15. The system of claim 13, wherein the messages that are rescanned are in an inbox on the email server.

16. The system of claim 11, wherein the updated spam detection rules are obtained from the email server after spam detection rules used by the email server are updated.

17. The system of claim 16, wherein the updated spam detection rules are the updated spam detection rules of the email server.

18. The system of claim 11, wherein the updated spam detection rules are obtained from the email server, from an update server, or via a peer-to-peer connection.

19. A computer program product for processing incoming email messages comprising:
a computer readable storage medium;
computer program instructions, recorded on the computer readable storage medium, executable by a processor, for performing the steps of:
receiving email messages in a local inbox or in an inbox on an email server, or both, the received email messages having been scanned using spam detection rules to determine whether or not they include spam;
obtaining updated spam detection rules; and
rescanning at least some of the received email messages using the updated spam detection rules to determine whether or not they include spam;
wherein each email message includes information indicating a version of spam detection rules that were used by the email server to scan the email and the rescanning is performed by rescanning only email messages that were scanned using a version of spam detection rules that is older than the updated spam detection rules, based on the information.

20. The computer program product of claim 19, wherein the received email messages were scanned by the email server.

21. The computer program product of claim 20, wherein the rescanning is performed by a user computer system.

22. The computer program product of claim 21, wherein the messages that are rescanned are in a local inbox on the user computer system.

23. The computer program product of claim 21, wherein the messages that are rescanned are in an inbox on the email server.

24. The computer program product of claim 19, wherein the updated spam detection rules are obtained from the email server, from an update server, or via a peer-to-peer connection.

25. The computer program product of claim 19, wherein the updated spam detection rules are obtained from the email server after spam detection rules used by the email server are updated.

26. The computer program product of claim 25, wherein the updated spam detection rules are the updated spam detection rules of the email server.

* * * * *